(12) United States Patent
Lee et al.

(10) Patent No.: US 9,217,818 B2
(45) Date of Patent: Dec. 22, 2015

(54) POLARIZER, DISPLAY DEVICE AND MANUFACTURING METHOD OF POLARIZER

(75) Inventors: Yun Bok Lee, Beijing (CN); Ku Hyun Park, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 250 days.

(21) Appl. No.: 13/336,215

(22) Filed: Dec. 23, 2011

(65) Prior Publication Data

US 2012/0162766 A1  Jun. 28, 2012

(30) Foreign Application Priority Data

Dec. 27, 2010  (CN) .......................... 2010 1 0606615

(51) Int. Cl.
  *G02B 27/26* (2006.01)
  *G02B 5/30* (2006.01)
  *G02B 27/28* (2006.01)

(52) U.S. Cl.
  CPC ............. *G02B 5/3016* (2013.01); *G02B 27/26* (2013.01); *G02B 27/286* (2013.01)

(58) Field of Classification Search
  CPC ............... G02F 2001/133538; G02F 1/13363; G02F 2001/133631; G02F 1/1337; G02F 1/13378–1/133788; G02F 2001/133792; G02F 1/133528; G02B 5/3016; G02B 5/3038; G02B 5/32; G02B 27/22; G02B 27/26; G02B 27/286; H04N 13/0434
  USPC .................. 359/900, 483.01, 486.01–486.02, 359/489.01, 489.07–489.08, 359/489.11–489.13, 489.15–489.17, 359/464–465; 349/96, 15, 102, 117, 121, 349/187, 189, 194; 117/58, 95, 97, 106; 427/162, 163.1, 209, 307; 216/24, 39; 348/58; 353/8
  See application file for complete search history.

(56) References Cited

U.S. PATENT DOCUMENTS 5,686,972 A  11/1997  Kim
5,686,975 A  11/1997  Lipton
(Continued)

FOREIGN PATENT DOCUMENTS

CN  1495468 A  5/2004
CN  1841156 A  10/2006
(Continued)

OTHER PUBLICATIONS

KIPO NOA dated May 20, 2013.
(Continued)

*Primary Examiner* — Stephone B Allen
*Assistant Examiner* — James McGee
(74) *Attorney, Agent, or Firm* — Ladas & Parry LLP

(57) ABSTRACT

A polarizer is provided comprising: a transparent substrate, on a main surface of which a plurality of grooves in parallel with each other are provided at an interval; a birefringence crystal layer with a single orientation formed on the main surface of the transparent substrate where the grooves are provided, wherein the birefringence crystal layer is at least filled in the grooves so that linearly polarized light incident on a location corresponding to the grooves and passing through the polarizer is converted into first polarized light, and linearly polarized light incident on a location between the grooves and passing through the polarizer is converted into second polarized light, the polarization directions of the first and the second polarized light are different from each other.

16 Claims, 4 Drawing Sheets

(56) References Cited

U.S. PATENT DOCUMENTS

| | | | |
|---|---|---|---|
| 5,739,952 A | 4/1998 | Takeda et al. | |
| 5,991,074 A | 11/1999 | Nose et al. | |
| 6,624,863 B1 * | 9/2003 | Jacobs et al. | 349/126 |
| 7,221,332 B2 * | 5/2007 | Miller et al. | 345/32 |
| 2006/0221284 A1 | 10/2006 | Yata et al. | |
| 2008/0239485 A1 | 10/2008 | Kuroda et al. | |
| 2011/0292329 A1 * | 12/2011 | Huang et al. | 349/117 |
| 2011/0292330 A1 * | 12/2011 | Huang et al. | 349/117 |

FOREIGN PATENT DOCUMENTS

| | | |
|---|---|---|
| CN | 101183177 A | 5/2008 |
| CN | 101290370 A | 10/2008 |
| CN | 101290399 A | 10/2008 |
| CN | 102262255 A | 11/2011 |
| JP | 10-227998 A | 8/1998 |
| JP | 2005-010768 A | 1/2005 |
| JP | 2010-281998 A | 12/2010 |
| KR | 20020088530 A | 11/2002 |

OTHER PUBLICATIONS

First Chinese Office Action dated Jan. 2, 2014 Appln. No. 201010606615.0.
Second Chinese Office Action dated May 28, 2014: Appln. No. 201010606615.0.
Third Chinese Office Action dated Sep. 22, 2014; Appln. No. 20100606615.0.
Fourth Chinese Office Action dated Feb. 27, 2015; Appln. No. 201010606615.0.
Japan Notification of The Examination Options; Drafting Date: Aug. 7: 2015: Appln. No. 2011-285419.

* cited by examiner

POLARIZER, DISPLAY DEVICE AND MANUFACTURING METHOD OF POLARIZER

BACKGROUND

Embodiments of the disclosed technology relate to a polarizer, a display device and a manufacturing method of a polarizer.

Three dimensional (3D) displays are one of the hotspots in the display technology. The three dimensional display can endow an image with high fidelity and give a viewer a sense of ultimate reality. The current 3D display technologies mainly comprise a glasses-free 3D display technology, a parallax barrier 3D display technology, a polarized light 3D display technology, a lenticular lens 3D display technology, and the like.

The principle of the polarization 3D display technology is as follows: a polarizer is provided on a display device so that the light passing therethrough becomes two kinds of polarized light with different polarization directions. As shown in FIG. 1, the two kinds of polarized light 11 and 12 with different polarization directions are arranged at an interval in the displaying region. When a viewer watches through a set of polarization glasses, images of the two different kinds of polarized light as in FIG. 1 are observed by the left eye and the right eye, respectively, so that the images for the left eye and the right eye can be different and a 3D display effect can be realized.

In the related art for realizing a polarization 3D display, the polarizer disposed on the display device is made by an alignment method such as multi-rubbing or ultraviolet light (UV light). Taking the UV light alignment method as an example, as shown in FIG. 2, a UV alignment film 22 is deposited on a transparent substrate 21; then as in FIG. 3, the UV alignment film 22 is illuminated by polarized light 24 (e.g., traversing polarized light) with a polarization direction (the first polarization direction) through a mask 23. The molecules of the UV alignment film 22 are cross-linked under the UV illumination so that the UV alignment film 22 being illuminated by the UV light can only transmit the polarized light of one polarization direction. Then, as shown in FIG. 4, the UV alignment film is illuminated by polarized light 26 (e.g., longitudinally polarized light) with another polarization direction (the second polarization direction, and different from the first polarization direction mentioned above) through a mask 25. Similarly, the molecules of the UV alignment film are cross-linked under the UV illumination so that the UV alignment film illuminated by the polarized light with the second polarization light can only transmit the polarized light of the second polarization direction.

Because the polarization directions of the polarized light used for the two illuminations are different from each other (generally, the two directions are perpendicular to each other for example), the resultant UV alignment film can transmit two polarized light with different polarization directions. With a design of the mask used as above, the regions for transmitting the two kinds of light with different polarization directions can be alternatively arranged at an interval on the polarizer.

However, as for manufacturing the polarizer using the UV light alignment method, the inventors have found that it has the following problems: two mask processes should be used and the manufacturing process is relatively complicated, and the cost for manufacturing the polarizer is relatively high.

SUMMARY

An embodiment of the disclosed technology provides a polarizer, comprising: a transparent substrate, on a main surface of which a plurality of grooves in parallel with each other are provided at an interval; a birefringence crystal layer with a single orientation formed on the main surface of the transparent substrate where the grooves are provided, wherein, the birefringence crystal layer is at least filled in the grooves so that linearly polarized light incident on a location corresponding to the grooves, along a direction perpendicular to the main surface of the transparent substrate, and passing through the polarizer is converted into first polarized light, and linearly polarized light incident on a location between the grooves, along the direction perpendicular to the main surface of the transparent substrate, and passing through the polarizer is converted into second polarized light, and the polarization directions of the first polarized light and the second polarized light are different from each other.

Another embodiment of the disclosed technology provides a manufacturing method of a polarizer, comprising the following steps: (1) forming a plurality of grooves in parallel with each other at an interval on a main surface of a transparent substrate; (2) forming a birefringence crystal layer with a single orientation on the main surface of the transparent substrate where the grooves are provided, wherein the birefringence crystal layer is at least filled in the grooves so that linearly polarized light incident on a location corresponding to the grooves, along a direction perpendicular to the main surface of the transparent substrate, and passing through the polarizer is converted into first polarized light, and linearly polarized light incident on a location between the grooves, along the direction perpendicular to the main surface of the transparent substrate, and passing through the polarizer is converted into second polarized light, the polarization directions of the first polarized light and the second polarized light are different from each other.

Still another embodiment of the disclosed technology provides a display device comprising a display panel and a polarizer as described above, which is disposed on a display face of the displaying panel.

Further scope of applicability of the present disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Embodiments of the disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

An embodiment of the disclosed technology provides a polarizer. In the polarizer, a plurality of grooves parallel with one side of a transparent substrate (e.g., of a rectangular shape) are provided on one main surface of the transparent substrate, and a birefringence crystal layer is formed on the main surface of the transparent substrate where the grooves are provided. The polarizer according to the embodiment of the disclosed technology can be disposed on a display face of a display device for 3D displaying.

Because the multi-rubbing and the UV light alignment of two times are not needed for the polarizer according to the embodiment of the disclosed technology, the manufacturing procedures can be simplified. Particularly, the mask processes are reduced comparing with the UV light alignment method. By adopting the embodiment of the disclosed technology, a polarizer can be manufactured more easily with a relatively low cost.

First Embodiment

Figure 1:
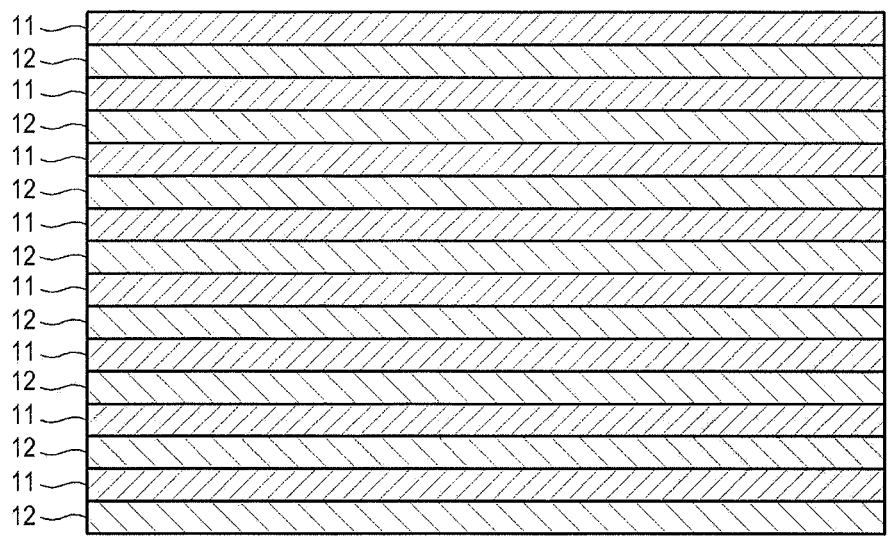
FIG. 1 is a schematic diagram of a polarized light 3D display technology in the related art.
Figure 2:
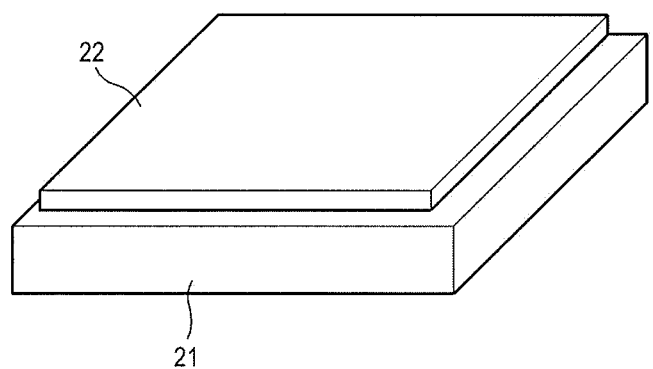
FIG. 2 is a schematic view for a first process in manufacturing a polarizer using a UV light alignment method in the related art.
Figure 3:
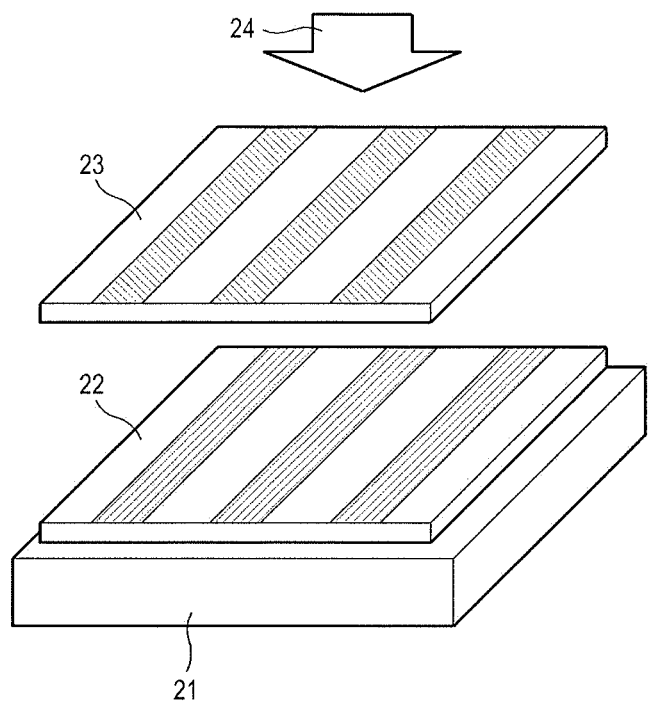
FIG. 3 is a schematic view for a second process in manufacturing the polarizer using the UV light alignment method in the related art.
Figure 4:
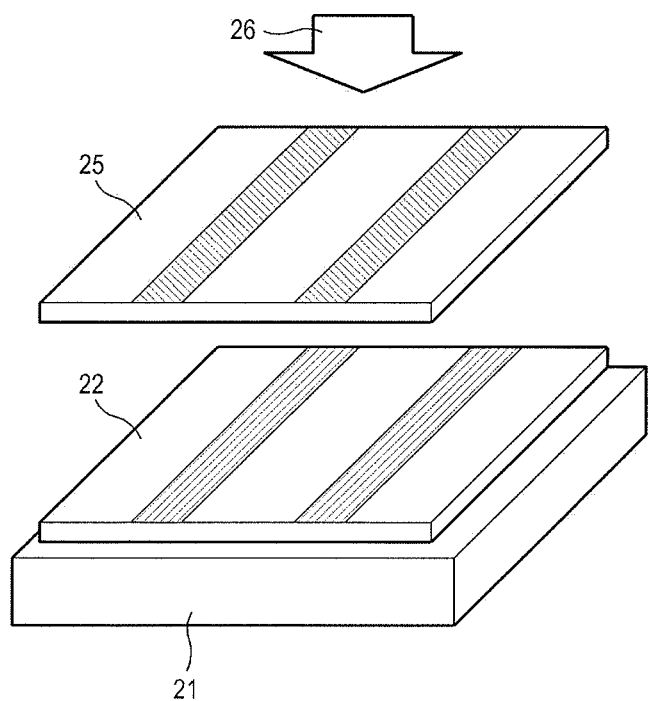
FIG. 4 is a schematic view for a third process in manufacturing the polarizer using the UV light alignment method in the related art.
Figure 5:
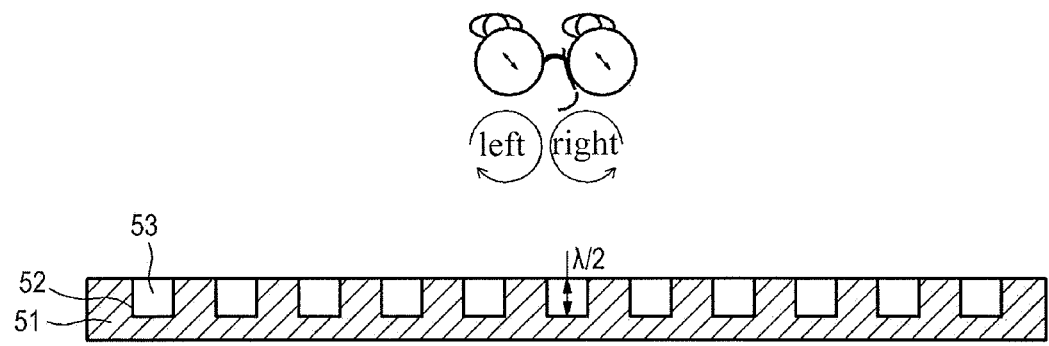
FIG. 5 is a structural view of a polarizer according to an embodiment of the disclosed technology.

The disclosed technology provides a polarizer, as shown in FIG. 5, the polarizer comprises a transparent substrate 51, and a plurality of grooves 52 parallel with a side of the transparent substrate are provided at a regular interval on a main surface of the transparent substrate 51. In the embodiment of the disclosed technology, the part with the grooves 52 and the part without the grooves form different light transmission regions. Further, in order to distinguish the light transmission regions, in an example the grooves 52 in the embodiment of the disclosed technology have a rectangular cross-sectional shape for instance, and the bottom of the grooves is parallel with the main surface of the transparent substrate. In order to change the polarization direction of transmitted light, a birefringence crystal layer 53 with a single orientation is formed on the main surface of the transparent substrate where the grooves are provided. The birefringence crystal layer 53 is at least filled in the grooves 52 so that the linearly polarized light incident on a location corresponding to the grooves, along a direction perpendicular to the main surface of the transparent substrate 51, and passing through the polarizer is converted into first polarized light, and the linearly polarized light incident on a location between the grooves (i.e., the part without the grooves) in a direction, also along the direction perpendicular to the main surface of the transparent substrate, and passing through the polarizer is converted into second polarized light; the polarization directions of the first polarized light and the second polarized light are different.

The grooves 52 according to the embodiment of the disclosed technology may be formed by a lithography process, an etching process, a drilling and milling process, or a sand blasting process so that the grooves can have a relatively accurate size.

The material of the birefringence crystal layer 53 according to the embodiment of the disclosed technology may employ a material the same as that of the commonly used quarter wave plate, or a reactive liquid crystal material.

In order to make the birefringence crystal layer 53 have a uniform crystal orientation, an alignment layer with a single orientation may be further disposed between the birefringence crystal layer and the transparent substrate according to the embodiment of the disclosed technology. Specifically, the alignment layer can be made by a UV alignment method.

In order to adjust the direction of the polarized light more accurately, the optical axis of the birefringence crystal layer is parallel with the main surface of the transparent substrate or in the plane of the main surface of the transparent substrate.

Figure 6:
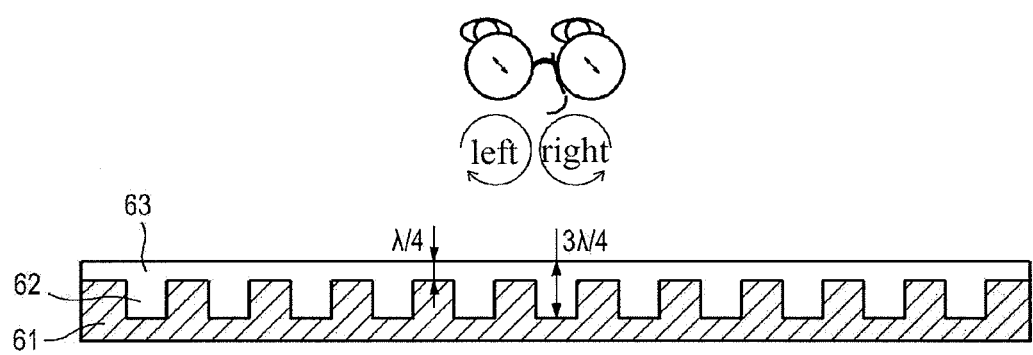
FIG. 6 is a structural view of a polarizer according to another embodiment of the disclosed technology.

As shown in FIGS. 5 and 6, in order to ensure that the polarized light exits from the different light transmission regions to have different polarization directions (generally, the two polarization directions are perpendicular to each other for example), the depth of the grooves on the transparent substrate and the thickness of the birefringence crystal layer 53 can be set, but not limited to, in the following two cases.

First, assuming the wavelength of the transmitted light is $\lambda$. As shown in FIG. 5, the birefringence crystal layer in the grooves is level (flush) with the surface plane of the transparent substrate, and the thickness of the birefringence crystal layer in the grooves 52 is the same as that of a half wave plate corresponding to the light to be transmitted (i.e., the thickness is set so that a retardation of $\lambda/2$ can be generated for the transmitted light). That is to say, the depth of the grooves 52 on the transparent substrate is the same as the thickness of the half wave plate corresponding to the light to be transmitted. By such a technical solution, the polarized light passing through the polarizer is changed into two kinds of linearly polarized light with different polarization directions, so that the images observed by the left eye and the right eye of the viewer wearing a set of glasses are different and the 3D displaying can be realized.

Second, assuming the wavelength of the transmitted light is $\lambda$. As shown in FIG. 6, the thickness of the birefringence crystal layer at the grooves 62 is the same as that of a three-quarter wave plate corresponding to the light to be transmitted (i.e., the thickness is set so that a retardation of $3\lambda/4$ can be generated for the transmitted light), and the thickness of the birefringence crystal layer at the part between the grooves 62 is the same as that of a quarter wave plate corresponding to the light to be transmitted (i.e., the thickness is set so that a retardation of $\lambda/4$ can be generated for the transmitted light). By such a technical solution, the polarized light passing through the polarizer is changed into two kinds of circularly polarized light with different polarization directions (i.e., opposite rotation directions), which can also realize a 3D displaying. In addition, the 3D displaying by the circularly polarized light can be observed at view points at arbitrary angles, and it is not necessary for the viewer to be directly in front of the display panel. For example, the viewer can rest against a sofa and enjoy 3D displaying without deteriorated image quality. Both the quarter wave plate and the three-quarter wave plate are optical devices that alter the polarization state of a light wave travelling through them. When light is transmitted through a wave plate and a phase shift of $\pi/2$ is created between the ordinary ray (o light) and the extraordinary light (e ray), the wave plate is a quarter wave plate. If the phase shift is $3\pi/4$, then the wave plate is a three-quarter wave plate.

Because neither a multi-rubbing process nor two times of UV light alignment processes are needed for manufacturing the polarizer provided by the embodiment of the disclosed technology, the manufacturing procedures are simplified. Particularly, the mask processes are reduced comparing with the UV light alignment method. By the embodiment of the disclosed technology, the polarization can be manufactured more easily with a relatively low cost.

Second Embodiment

An embodiment of the disclosed technology provides a manufacturing method of a polarizer, and the method comprises the following steps.

(1) Forming a plurality of grooves at a regular interval on a main surface of a transparent substrate, and the extending direction of the grooves being parallel with a side of the transparent substrate. In the embodiment of the disclosed technology, the part with the grooves and the part without the grooves form different light transmission regions. Further, in order to distinguish the light transmission regions, in an example the grooves in the embodiment of the disclosed technology have a rectangular cross-sectional shape for instance, and the bottom of the grooves is parallel with the main surface of the transparent substrate.

The step for forming the grooves can employ the following process but not limited thereto.

First, forming grooves by a patterning process. Specifically, it may comprise a lithography process or an etching process. The general patterning process needs a mask to form a photoresist layer with a determined pattern, and then the transparent substrate is etched to a desired depth.

Figure 7:
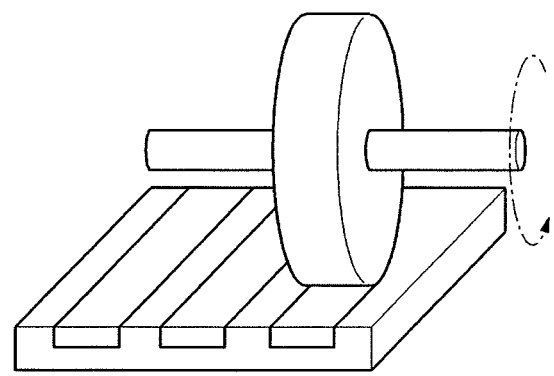
FIG. 7 is a schematic view of a sand blasting process in an embodiment of the disclosed technology.

Second, forming grooves by a sand blasting process. As shown in FIG. 7, the sand blasting device rotating in a high speed physically grinds the transparent substrate so as to form the grooves.

Figure 8:
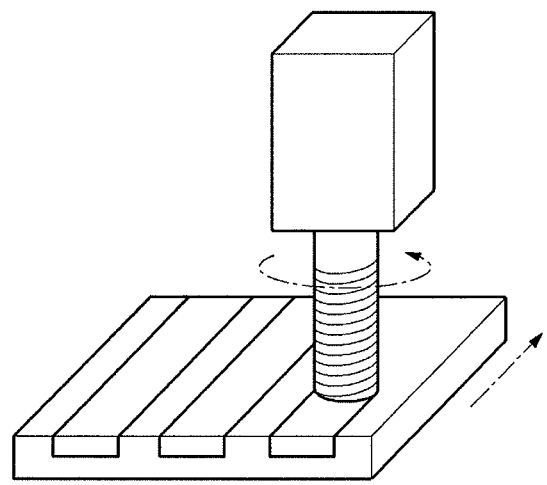
FIG. 8 is a schematic view of a drilling and milling process in an embodiment of the disclosed technology.

Third, forming grooves by a drilling and milling process. As shown in FIG. 8, drilling and milling are simultaneously performed on the transparent substrate by using a bore cutter capable of micro machining.

(2) After forming the above grooves, forming a birefringence crystal layer with a single orientation on the main surface of the transparent substrate where the grooves are formed. The birefringence crystal layer is at least filled in the grooves so that the linearly polarized light incident on a location corresponding to the grooves, along a direction perpendicular to the main surface of the transparent substrate, and passing through the polarizer is converted into first polarized light, and the linearly polarized light incident on a location between the grooves (i.e., the part without the grooves), also along the direction perpendicular to the main surface of the transparent substrate, and passing through the polarizer is converted into second polarized light, the polarization directions of the first polarized light and the second polarized light are different. The material of the birefringence crystal layer according to the embodiment of the disclosed technology may employ a material the same as that of the commonly used quarter wave plate, or a reactive liquid crystal material.

Because the thickness of the birefringence crystal layer at the grooves is relatively large, the light passing through the birefringence crystal layer in different regions will have different deflection angles, so that the polarized light of different polarization directions corresponding to the different regions are generated. In addition, because the grooves according to the embodiment of the disclosed technology are arranged at an interval, the polarized light with different polarization directions can be provided at the interval in the displaying region. When the viewer watches through a set of polarization glasses, the left eye and the right eye can observe the different polarized light, and the 3D displaying effect can be realized.

Because neither a multi-rubbing process nor two times of UV light alignment are needed for manufacturing the polarizer provided by the embodiment of the disclosed technology, the manufacturing procedures are simplified. Particularly, the mask processes are reduced comparing with the UV light alignment method. By the embodiment of the disclosed technology, the polarization can be manufactured more easily with a relatively low cost.

In order to make the birefringence crystal layer 53 have a uniform crystal orientation, in an example the method according to the embodiment of the disclosed technology may further comprise: between the step (1) and the step (2), forming an alignment layer with a single orientation on the transparent substrate. Specifically, the alignment layer can be made by a UV alignment method.

In order to adjust the direction of the polarized light more accurately, the optical axis of the birefringence crystal layer is parallel with the main surface of the transparent substrate or in the plane of the main surface of the transparent substrate.

In order to ensure that the polarized light exits from the different light transmission regions to have different polarization directions (generally, the two polarization directions are perpendicular to each other for example), the depth of the grooves on the transparent substrate and the thickness of the birefringence crystal layer 53 can be set, but not limited to, in the following two cases.

First, assuming the wavelength of the transmitted light is $\lambda$. As shown in FIG. 5, the birefringence crystal layer in the grooves is level with the surface plane of the transparent substrate, and the thickness of the birefringence crystal layer in the grooves 52 is the same as that of a half wave plate corresponding to the light to be transmitted. That is to say, the depth of the grooves 52 on the transparent substrate is the same as the thickness of the half wave plate corresponding to the light to be transmitted. By such a technical solution, the polarized light passing through the polarizer is changed into two kinds of linearly polarized light with different polarization directions, so that the images observed by the left eye and the right eye of the viewer wearing a set of glasses are different and the 3D displaying can be realized.

Second, assuming the wavelength of the transmitted light is $\lambda$. As shown in FIG. 6, the thickness of the birefringence crystal layer at the grooves 62 is the same as that of a three-quarter wave plate corresponding to the light to be transmitted, and the thickness of the birefringence crystal layer at the part between the grooves 62 is the same as that of a quarter wave plate corresponding to the light to be transmitted. By such a technical solution, the polarized light passing through the polarizer is changed into two kinds of circularly polarized light with different polarization directions (i.e., opposite rotation directions), which can also realize a 3D displaying. In addition, the 3D displaying by the circularly polarized light can be observed at view points at arbitrary angles, and it is not necessary for the viewer to be directly in front of the display panel. For example, the viewer can rest against a sofa and enjoy 3D displaying without deteriorated image quality.

An embodiment of the disclosed technology also provides a display device. The display device comprises a display panel and a polarizer disposed on the display face of the display panel. In order to simplify the manufacturing procedures and reduce the costs, the polarizer in the embodiment of the disclosed technology employs the polarizer according to the first embodiment, which will not be described repeatedly.

The embodiment of the disclosed technology is mainly used in the 3D display technology, particularly, the polarized light 3D display technology.

It should be noted that the above embodiments only have the purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. A polarizer, comprising:
    a transparent substrate, on a main surface of which a plurality of grooves in parallel with each other are provided at an interval, the grooves being directly formed in the transparent substrate, and a part of the transparent substrate between the grooves and a part of the transparent substrate below the grooves being integrally formed;
    a birefringence crystal layer with a single orientation formed on the main surface of the transparent substrate where the grooves are provided,
    wherein, the birefringence crystal layer is at least filled in the grooves so that linearly polarized light incident on a location corresponding to the grooves, along a direction perpendicular to the main surface of the transparent substrate, and passing through the polarizer is converted into first polarized light, and linearly polarized light incident on a location between the grooves, along the direction perpendicular to the main surface of the transparent substrate, and passing through the polarizer is converted into second polarized light, and polarization directions of the first polarized light and the second polarized light are different from each other,
    wherein, the birefringence layer is provided at the grooves and on the part of the transparent substrate between the grooves, a thickness of the birefringence layer at the grooves is equivalent to a thickness of a three-quarter wave plate corresponding to light to be transmitted, a thickness of the birefringence crystal layer on the part between the grooves is equivalent to a thickness of a quarter wave plate corresponding to the light to be transmitted; and
    the first and second polarized light are circularly polarized light.

2. The polarizer of claim 1, wherein, the first polarized light and the second polarized light are circularly polarized light, and rotation directions of the first and second circularly polarized light are opposite to each other.

3. The polarizer of claim 1, wherein, the grooves are provided on the transparent substrate at a regular interval, a cross-section of the grooves has a rectangular shape, and a bottom of the grooves is parallel with the main surface of the transparent substrate.

4. The polarizer of claim 1, wherein, the transparent substrate is of a rectangular shape, and an extending direction of the grooves is parallel with one side of the transparent substrate.

5. The polarizer of claim 1, wherein, the groove are formed by a lithography process, an etching process, a drilling and milling process, or a sand blasting process.

6. The polarizer of claim 1, wherein, the birefringence crystal layer is made of a reactive liquid crystal or a material the same as that of a quarter wave plate.

7. The polarizer of claim 1, wherein, an optical axis of the birefringence crystal layer is parallel with the main surface of the transparent substrate.

8. The polarizer of claim 1, wherein, an alignment layer is further provided between the birefringence crystal layer and the transparent substrate.

9. A display device, comprising:
    a display panel, and
    a polarizer of claim 1, which is disposed on a display face of the display panel.

10. A manufacturing method of a polarizer, comprising the following steps:
    (1) forming a plurality of grooves in parallel with each other at an interval on a main surface of a transparent substrate, the grooves being directly formed in the transparent substrate, and a part of the transparent substrate between the grooves and a part of the transparent substrate below the grooves being integrally formed;
    (2) forming a birefringence crystal layer with a single orientation on the main surface of the transparent substrate where the grooves are provided,
    wherein, the birefringence crystal layer is at least filled in the grooves so that linearly polarized light incident on a location corresponding to the grooves, along a direction perpendicular to the main surface of the transparent substrate, and passing through the polarizer is converted into first polarized light, and linearly polarized light incident on a location between the grooves, along the direction perpendicular to the main surface of the transparent substrate, and passing through the polarizer is converted into second polarized light, and polarization directions of the first polarized light and the second polarized light are different from each other,
    wherein, the birefringence layer is provided at the grooves and on the part of the transparent substrate between the grooves, a thickness of the birefringence layer at the grooves is equivalent to a thickness of a three-quarter wave plate corresponding to light to be transmitted, a thickness of the birefringence crystal layer on the part between the grooves is equivalent to a thickness of a quarter wave plate corresponding to the light to be transmitted; and
    the first and second polarized light are circularly polarized light.

11. The method of claim 10, wherein, the grooves are provided on the transparent substrate at a regular interval, a cross-section of the grooves has a rectangular shape, and a bottom of the grooves is parallel with the main surface of the transparent substrate.

12. The method of claim 10, wherein, the transparent substrate is of a rectangular shape, and an extending direction of the grooves is parallel with one side of the transparent substrate.

13. The method of claim 10, wherein, a process for forming the grooves in the Step (1) is a lithography process, an etching process, a drilling and miffing process, or a sand blasting process.

14. The method of claim 10, wherein, the birefringence crystal layer is made of a reactive liquid crystal or a material the same as that of a quarter wave plate.

15. The method of claim 10, wherein, an optical axis of the birefringence crystal layer is parallel with the main surface of the transparent substrate.

16. The method of claim 10, further comprising:
between the Step (1) and the Step (2), forming an alignment layer on the transparent substrate.

\* \* \* \* \*